June 2, 1942.  U. MUNSCHAK  2,284,673

ELECTRIC HEATING SYSTEM FOR GARMENTS AND OTHER OBJECTS

Filed May 16, 1940   3 Sheets-Sheet 1

INVENTOR:
USCHER MUNSCHAK
BY Haseltine Lake & Co.
ATTORNEYS

June 2, 1942. U. MUNSCHAK 2,284,673
ELECTRIC HEATING SYSTEM FOR GARMENTS AND OTHER OBJECTS
Filed May 16, 1940 3 Sheets-Sheet 2
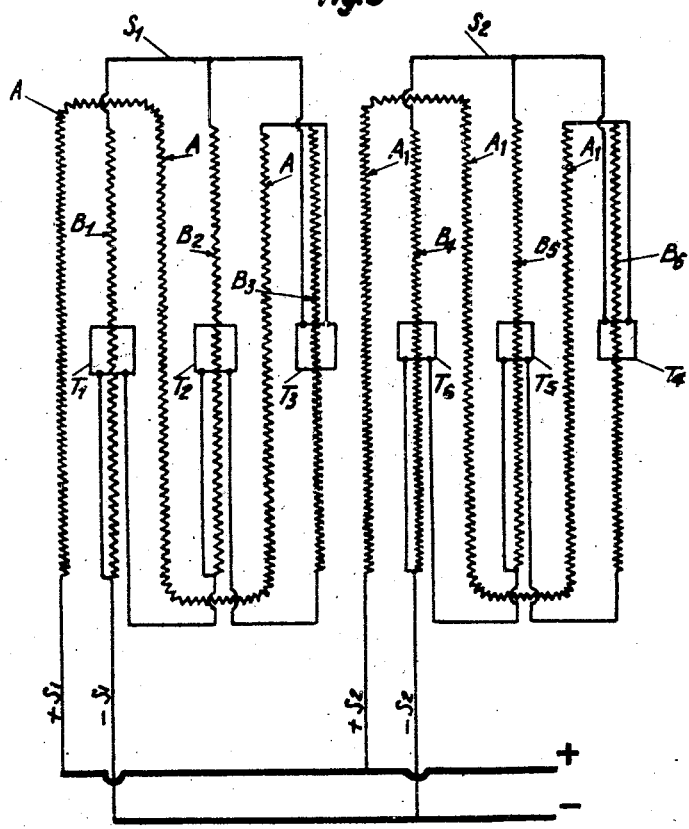
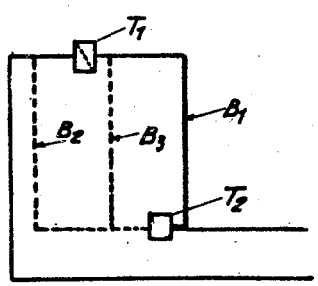
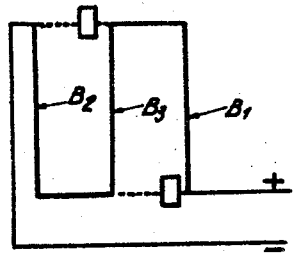
INVENTOR:
USCHER MUNSCHAK
BY Haseltine, Lake & Co.
ATTORNEYS June 2, 1942. U. MUNSCHAK 2,284,673
ELECTRIC HEATING SYSTEM FOR GARMENTS AND OTHER OBJECTS
Filed May 16, 1940 3 Sheets-Sheet 3
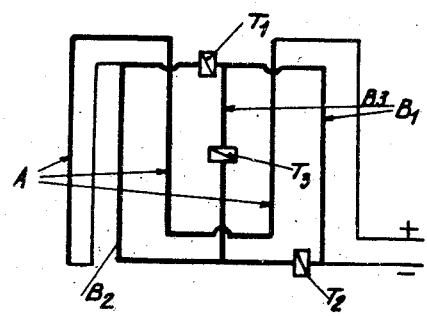
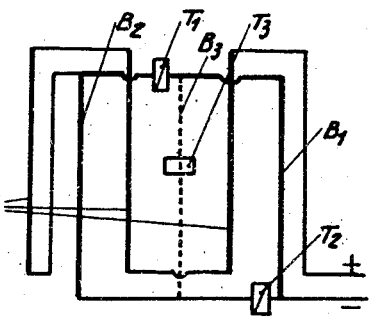
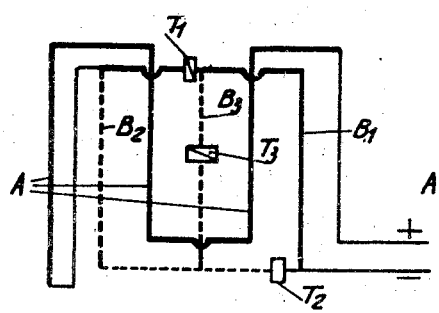
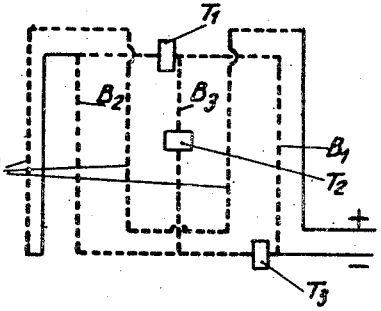
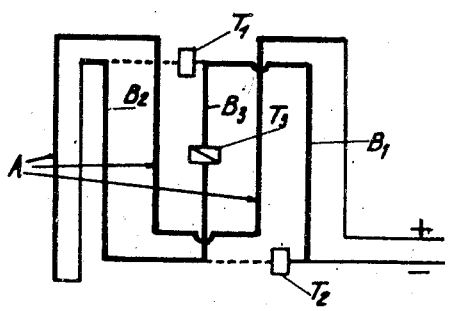
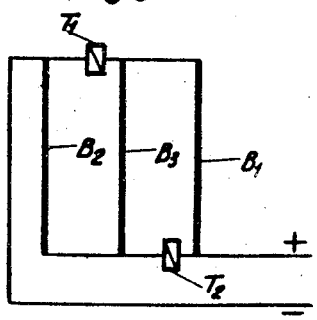
INVENTOR:
USCHER MUNSCHAK
BY Haseltine, Lake & Co.
ATTORNEYS Patented June 2, 1942

2,284,673

UNITED STATES PATENT OFFICE 2,284,673

ELECTRIC HEATING SYSTEM FOR GARMENTS AND OTHER OBJECTS

REISSUED

Uscher Munschak, Paris, France, assignor of one-half to Jacob Wolodarsky, Paris, France Application May 16, 1940, Serial No. 335,515
In France June 1, 1939

9 Claims. (Cl. 219—46)

This invention relates to electric heating systems which may be used in garments, covers, cushions and in structures, which have their operation and heating effect indirectly controlled by and dependent upon the temperature of the surrounding air or other fluid.

The main object of my invention is to have a heating system of the character indicated which automatically maintains a uniform temperature of an object to which it is applied despite variation of low temperatures prevailing in the ambient fluid about said object.

The growing development of aviation and the tendency to fly at the highest possible altitudes have rendered necessary the use of electrically heated garments.

The experiences made till now have not entirely succeeded, as the heating systems employed not being provided with regulating means or having an uneffective regulation by means of the actuation by hand of an electrical current switch, were unable to ensure the automatic stabilization of the garment's temperature at a predetermined and fixed value.

The present invention also has as an object the construction of a safety electrically heated garment with automatic regulation of its temperature at a predetermined value, without considerable variations. In order to attain such object, several means are essentially combined according to the invention, in the constitution of the said garment.

The invention will be better understood with the aid of the following description and of the accompanying drawings, which show, by way of nonrestrictive example, one of its embodiments.

The garment itself: combined aviator garments, flying suits, coats, jackets, vests, waistcoats, trousers, socks, gloves, shoes, head and face garments, helmets, face masks and the like, is made of leather, fur, wool cloth or any other suitable material.

It is provided with a suitable lining, like an ordinary garment. Between the garment and the lining is mounted a flexible wire heater. Between the said heater and the garment's fabric is inserted a layer of heat insulating material which may be made of any kind of cotton, wool or silk wadding or with any other kind of heat insulating fabric. The heater and the heat insulating layer extend through the entire surface of the garment.

The electrical heater is bounded by two layers of waterproof and dielectric fabric. On the whole surface are formed, by means of lines of parallel stitchings binding together the two waterproofed fabric layers, sheaths or channels in which heating cords are lodged. The number and measures of such channels are determined by the number of heating cords to be lodged. These heating cords are formed with an asbestos core surrounded by a conducting wire working as an electric resistance, the whole being covered with a brading consisting in an asbestos layer forming a fire-proof medium around the resistance layer. The measures of the resistance wire are determined by the electrical voltage and current with which the garment is to be fed.

Figures 1 and 2 of the accompanying drawings show, respectively in elevation and in transversal section, part of the garment together with its heater. On these figures TV is the fabric layer of the garment; MI is the layer of fire proof material; TC are the external layers of waterproof fabric, of the heater; TD is the lining fabric and C are the channels or sheaths in which the heating cords are recessed, these channels resulting from the binding together of the two fabric sheets TC; the stitching lines are shown in broken lines on Figure 2.

The electrical heating is thus ensured by means of heating cords CC of Figures 1 and 2.

For the automatic heating regulation there are generally used various automatic devices, designed to work in a medium more or less homogeneously heated. As these circumstances do not prevail in the case of the heating of garments, the automatic regulation of the temperature of the heating garment, according to the invention, is indirectly made, by using small special automatic regulators, for adjusting the temperature of the resistance wires, each of such wires being homogeneously heated over its whole length, when it is fed with electric current. It is sufficient to control the temperature in an only point of the resistance wire of each circuit, in order to reach an homogeneous regulation of the heater over its whole extension. The temperature of the garment establishing itself as a direct function of the heater's temperature, by this method an homogeneous regulation of the garment itself is reached.

In order to obtain a more homogeneous and precise regulation, the invention provides for a heating system with regulation of individual sections.

The heater is divided, over its entire area into several more or less equivalent sections, each of which is heated by means of a separately regulated heating element. Figure 3 shows diagrammatically part of the heater in which some of the heating sections are provided with a separate regulation.

$S_1$ and $S_2$ are two sections or groups of distinct heating circuits, each of them being separately regulated, by means of one of the three regulators $T_1$, $T_2$, $T_3$, and $T_4$, $T_5$, and $T_6$.

Each section comprises three parallel connected resistance elements $B_1$, $B_2$, $B_3$, or $B_4$, $B_5$, and $B_6$, in series with resistance $A$ or $A_1$. The conductors of circuits $S_1$ or $S_2$ are marked with sign $+$ or $-$, according as they are connected with one or the other terminal of the source.

Two regulating methods are adapted, in order to be applied together or separately:

1. Regulation by intermittent flow of the electric current caused by the working of the automatic regulators inserted in each section and in each heating circuit.

2. Regulation by automatic series or parallel switching of the electric circuits of the resistance wires, by means of the electrical switching system resulting from the presence of the automatic regulators.

Figures 4, 5, 6, 7, and 8 relate to some details of this last regulation method by sections.

They diagrammatically show five different phases of the closing and opening of the automatic regulators or thermostats inserted in each heating section and mounted so as to work under the effect of the exterior temperature as it affects the relative temperature of the resistance wires.

Figure 4 shows the starting phase; there is visible on this figure heating element or section $A$ in series with the three elements $B_1$, $B_2$ and $B_3$ in parallel, when the three regulators $T_1$, $T_2$, $T_3$ are all locked, that is, on the contacting position.

Figure 5 shows a following phase, in which regulator $T_2$ is unlocked (that is, on the cutting off position) and regulators $T_1$ and $T_3$ are locked. Element $A$ is visible, in series with element $B_1$. The result will be equivalent when regulator $T_2$, or $T_1$ and $T_3$, or $T_2$ and $T_3$, will be unlocked (the other regulator(s) being locked) that is, in all these cases, element $A$ would be in series with a single element $B$.

Figure 6 shows a third phase, where the two regulators $T_1$ and $T_2$ are unlocked and the only regulator $T_3$ is locked. Element $A$ is visible in series with elements $B_1$, $B_2$ and $B_3$, themselves in series one with the others.

Figure 7 shows a fourth phase of unlocking of the only regulator $T_3$. There is visible element $A$ in series with the two elements $B_2$ and $B_1$, which are in parallel one with the other.

Figure 8 shows a fifth phase with all the three regulators $T_1$, $T_2$, $T_3$ unlocked. The current is seen to be interrupted everywhere and the heating is thus stopped.

Figure 1:
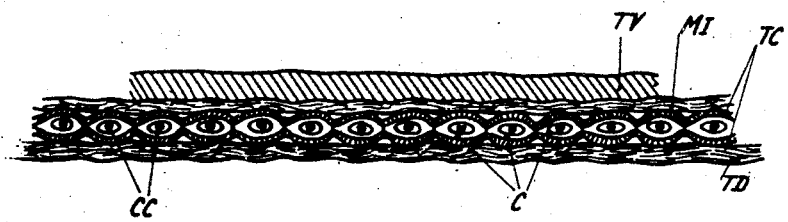
Figure 2:
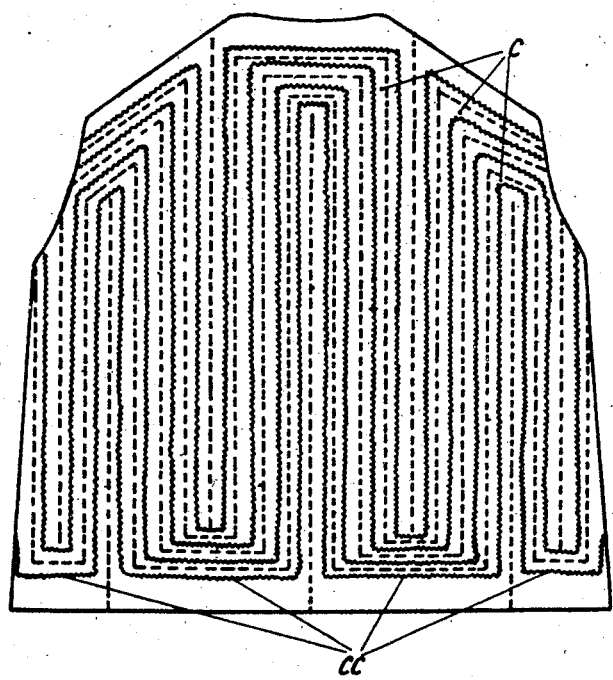

In practice regulators $T_1$ and $T_2$ are adjusted with a slight advance at starting, with reference to regulator $T_3$ and so as to lock or unlock in synchronism one with the other, which in fact limits the whole regulating process to only three phases, viz. those of Figures 4, 6 and 8. It is easy to see that, in each phase the electrical resistance of the heating section is different, a circumstance which gives a variation of the electric current and a heating regulation. The cadence of the regulation may be chosen at will by varying the equivalent resistance and maintaining the whole current in each circuit group constituted by elements $A$ and $B$ variously switched. If, for instance, there must be established an adjustment of 50% between the phase of Figure 4 and that of Figure 6, there can be deduced from formula:

$$2\left(A+\frac{1}{3}B\right)=(A+3B)$$

that $$A=\frac{7}{3}B$$

If $A$ is the resistance of element $A$, expressed in ohms, $B$ the resistance of each element $B_1$, $B_2$, $B_3$ expressed in ohms, the resistance of the phase of Figure 4 would be:

$$A+\frac{1}{3}B \text{ in ohms}$$

and the resistance of the phase of Figure 6 would be: $A+3B$ in ohms, supposing that resistances are equal: $B_1=B_2=B_3$.

It is also possible to provide automatic switching systems in series or in parallel with only $B$ elements. For instance, Figure 9 shows a system of three $B$ elements combined with two automatic regulators, giving: a first phase (Figure 9) of starting, when both regulators $T_1$ and $T_2$ are locked, the three elements being all in parallel and the resulting resistance being $\frac{1}{3}B$ ohm.

A second phase (Figure 10) with only one regulator locked, the resistance being $B$ ohms.

A third phase (Figure 11) with both regulators unlocked, the three elements being in series and the resistance amounting to $3B$ ohms.

It is manifest that two or more heating sections $S_1$ and $S_2$ may be used simultaneously and connected in parallel, as for example already alluded to in Fig. 3, in which the sections $A$ and $A_1$ are both connected in parallel to the current mains. It is also clear that the regulators or thermostats $T_1$, $T_2$ and $T_3$ may be set to close at different temperatures than in the case of $T_4$, $T_5$ and $T_6$, while all three in each case may be set for different temperatures or two may be set to operate at a given temperature and the third set for a higher or lower temperature. On the other hand, only two thermostats may be used in a section, or more than the three shown, up to any number found most useful in a particular case, so long as a plurality are used.

Having now fully described my invention, I claim:

1. An automatic electrical heating system adapted for use in garments, covers, cushions, fabrics and other objects, and effective to produce and maintain a stabilized, substantially uniform temperature for said garment or other object as a function of the temperature of the air or other fluid surrounding said garment or object, said system including a first resistance adapted for connection at one end to a source of current supply and at the other end having two branch circuits connected in parallel thereto, a thermostat having one pole thereof connected to one branch circuit and a second resistance connected to the other branch circuit, two further branch circuits connected in parallel to the other pole of said thermostat, a third resistance connected at one end to one of said further branch circuits and a fourth resistance connected at one end to the other of said further branch circuits, a conductor adapting the other end of the third resistance for connection to said source of current, connecting means connecting said conductor in parallel to the other ends of the second and fourth resistances, and at least one thermostat included in said connecting means between said second and fourth resistances and said conductor, at least one of the thermostats being set to open at a different temperature than the one or more other thermostats in the system.

2. An automatic electrical system according to claim 1, having an additional thermostat included in the connecting means between the second and fourth resistances.

3. An automatic electrical system according to claim 1, having the thermostats disposed adjacent portions of the resistances so as to be responsive to the temperatures thereof.

4. An automatic electrical system according to claim 1, having the thermostats disposed adjacent portions of the first resistance and also adjacent limited portions of at least one of the other resistances so as to be responsive to the temperatures thereof.

5. An automatic electrical system according to claim 1, having an additional thermostat included in the connecting means between the second and fourth resistances, and having the thermostats disposed adjacent portions of the first resistance and also adjacent limited portions of at least one of the other resistances so as to be responsive to the temperatures thereof.

6. An automatic electrical heating system adapted for use in garments, covers, cushions, fabrics, and other objects, and effective to produce and maintain a stabilized, substantially uniform temperature for said garment or other object as a function of the temperature of the air or other fluid surrounding said garment or object, said system including a first resistance adapted for connection at one end to a source of current supply and at the other end having two branch circuits connected in parallel thereto, a thermostat having one pole thereof connected to one branch circuit and a second resistance connected to the other branch circuit, further branch circuits connected to the other pole of said thermostat and to the other end of the second resistance, a plurality of resistances individually included in some of said further branch circuits, connecting means serving to connect all of said further branch circuits to the source of current supply, and at least one additional thermostat included in said connecting means between at least one of said further branch circuits and said current source.

7. An automatic electrical system according to claim 1, in which the system is repeated so that each system forms a single section of the resulting multiple or plural system, and in which all systems or sections are connected in parallel.

8. An automatic electrical system according to claim 6, in which the system is repeated so that each system forms a single section of the resulting multiple or plural system, and in which all systems or sections are connected in parallel.

9. An automatic electrical heating system adapted for use in garments, covers, cushions, fabrics and other objects, and effective to produce and maintain a stabilized, substantially uniform temperature for said garment or other object as a function of the temperature of the air or other fluid surrounding said garment or object, said system including a first resistance adapted for connection at one end to a source of current supply and at the other end having two branch circuits connected in parallel thereto, a thermostat having one pole thereof connected to one branch circuit and a second resistance connected to the other branch circuit, two further branch circuits connected in parallel to the other pole of said thermostat, a third resistance connected at one end to one of said further branch circuits and a fourth resistance connected at one end to the other of said further branch circuits, a conductor adapting the other end of the third resistance for connection to said source of current, connecting means connecting said conductor in parallel to the other ends of the second and fourth resistances, an additional thermostat included in said connecting means between said other ends of the second and fourth resistances and said conductor, and a third thermostat also included in said conducting means between one of said last mentioned two resistances and the additional thermostat.

USCHER MUNSCHAK.